United States Patent [19]

Marantette et al.

[11] Patent Number: 4,577,113

[45] Date of Patent: Mar. 18, 1986

[54] TWO AXIS CENTERING SYSTEM WITH OSCILLATING PHOTOCELLS

[76] Inventors: William F. Marantette; Ruth B. Marantette, both of 20624 Earl St., Torrance, Calif. 90503

[21] Appl. No.: 606,474

[22] Filed: May 3, 1984

[51] Int. Cl.[4] ............................................. G01N 21/86
[52] U.S. Cl. .................................... 250/548; 250/234
[58] Field of Search ............... 250/202, 203, 548, 557, 250/234; 33/1 M; 356/391, 399

[56] References Cited

U.S. PATENT DOCUMENTS

| | | | |
|---|---|---|---|
| 3,293,439 | 12/1966 | Marantette et al. | 250/203 |
| 3,716,716 | 2/1973 | Marantette et al. | 250/203 |
| 4,100,405 | 7/1978 | Kondrollochis | 250/202 |

Primary Examiner—David C. Nelms
Assistant Examiner—J. Gatto
Attorney, Agent, or Firm—Pastoriza, Kelly & Lowry

[57] ABSTRACT

The system effects positioning of an art work at precise given X and Y rectangular coordinate points. This art work may correspond to drill hole positions in a printed circuit board. By recording in memory the exact rectangular coordinate points on the art work and the necessary servo signals to effect exact centering at the coordinate points, accurate circuit board drilling can be carried out. A circular hole is provided in the art work and an image of this hole projected to a screen having horizontal and vertical cross hairs defining X and Y axes respectively. The art work is precisely positioned at a given pair of rectangular coordinates when the intersection of the cross hairs corresponds exactly with the exact center of the image of the circular hole. Exact centering is achieved by causing first and second light responsive photo cells to oscillate along the X and Y axes directions respectively, the centers of oscillation of the cells corresponding to the intersection point of the cross hairs. If the projected image of the hole is off center, a cell or cells will be exposed to light longer on one side of its center position than on the other. Stated differently, the projected image will only be centered when the scanning cells are exposed to light for equal time intervals on either side of their center of oscillation positions. The difference in such time intervals is used to generate a corrective signal for operating the servos to effect precise center positioning.

4 Claims, 6 Drawing Figures

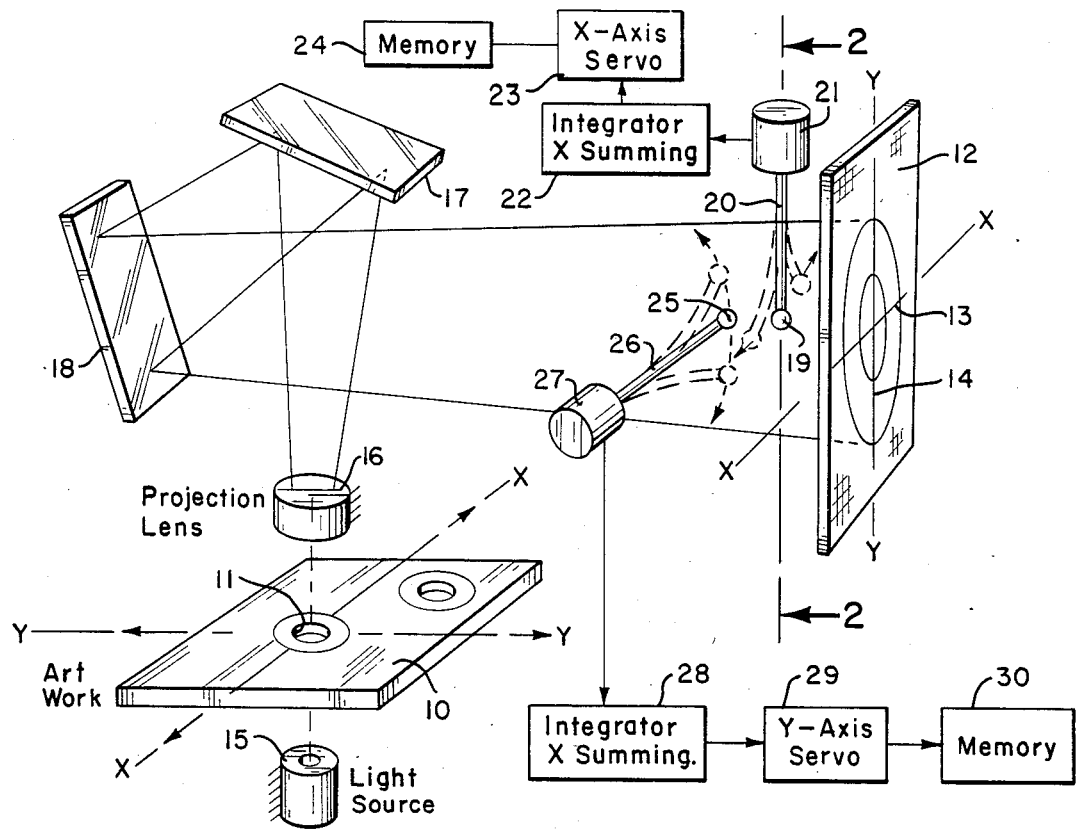
FIG. 1
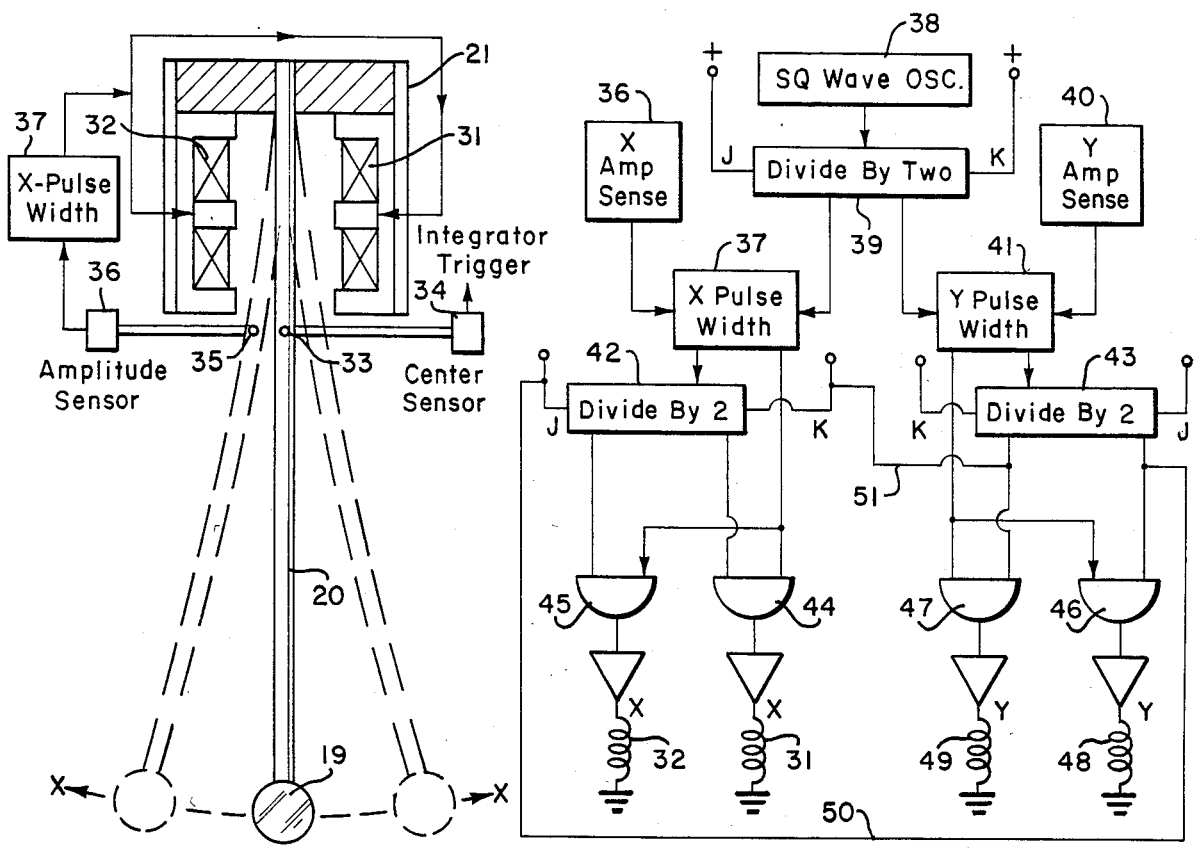
FIG. 2
FIG. 3

TWO AXIS CENTERING SYSTEM WITH OSCILLATING PHOTOCELLS

BACKGROUND OF THE INVENTION

This invention relates generally to a two axis centering system particularly useful for positioning a work in an X, Y coordinate plane in accordance with given precise coordinate points. These given precise coordinate points are provided on a master control member such as a template or master art work in order that automatic machining operations can be carried out accurately.

In our U.S. Pat. No. 3,293,439 issued Dec. 20, 1966 and entitled TWO AXIS PHOTOELECTRIC POSITIONING SYSTEM INCLUDING ALTERNATE AXIS ACTIVATION OF PHOTO CELL, there is described a photoelectric means for effecting positioning of a master template at precise rectangular coordinate points. Essentially, a photocell is provided on one side of the master template and a light source on the other, the master template including a hole through which the light passes. Off-centering of the hole changes the light pattern on the photo cell giving rise to signals which operate servo motors to move the master template for art work in a proper direction to exactly center the hole relative to the light path; that is, to minimize the servo signals. These movements also control a circuit board or other work through which a hole is to be drilled at a desired coordinate position.

While the system briefly described above operates satisfactorily, it is found that in utilizing the holes in a master template, there is often a variation in the size or diameter of the hole with the result that consistent operation cannot always be realized. Further, the master template may be defective, such that light passes through a non-circular opening to strike the cell and such could operate the drilling mechanism, thereby drilling a false hole. Finally, for extremely large holes in the master template, off centering of the hole cannot be as accurately detected as is desirable for precision operations.

In our later U.S. Pat. No. 3,716,716 issued Feb. 13, 1973 and entitled "PHOTOELECTRIC TWO AXIS POSITIONING SYSTEM", we disclose an improved photoelectric two axis positioning system developed by us wherein far greater accuracy in precisely centering a hole relative to fixed rectangular coordinates is realizable, even though the hole itself may vary in diameter.

In accord with this improved invention, a member such as a master art work having a circular hole is positioned between a light source and a photo cell, the path of light being on an axis normal to the member and passing precisely through the given coordinate points. A slot is provided between the photo cell and the hole in the member, the slot extending radially from the given axis beyond the boundary of the hole. With this arrangement, it will be evident that by revolving the slot about the axis of the light path, the photo cell will receive a constant amount of light for any revolved position of the slot only when the exact center of the hole in the member coincides with the axis of revolution. Any off-centering of the hole from the axis will result in a variable amount of light passing to the cell over a complete cycle of rotation, thereby enabling a variable signal to be derived from the cell. This signal may be employed to operate servo motors to move the member or master art work in a direction to minimize the variations in the signal and thereby assure the exact centering of the hole in the member at the given coordinate points.

While our foregoing arrangement provides great improvement in precise two axis centering systems, the use of the revolving slot requires a very careful and expensive machining operation to assure mechanical perfection. Moreover, in the event that the light passing through the hole does not provide for precise uniform illumination over the entire area of the hole, false variable signals can be generated by the revolving slot, even though precise centering has been achieved. Finally, the response time in effecting centering involves the detection of the variable signal and conversion of the same into appropriate servo signals and there is consequently some delay in effecting the centering.

BRIEF DESCRIPTION OF THE PRESENT INVENTION

With the foregoing considerations in mind, the present invention contemplates a further improved two axis centering system of far greater accuracy in precisely centering a hole relative to fixed rectangular coordinates than has been realizable with the foregoing described prior art systems even though the light across the area of the hole may not be uniform. Further, the system of the present invention provides for a very rapid response to any off-centering by developing direct servo signals for operating X and Y servos to effect centering.

In accord with the method of this invention, a member such as an art work, has a circular hole therein positioned at precise given X and Y rectangular coordinate points. The steps of the method include projecting an image of the circular hole in the member onto a screen having horizontal and vertical cross hairs defining X and Y axes respectively. By definition, the member is positioned at the given precise rectangular coordinate points when the intersection point of the cross hairs is at the exact center of the image of the circular hole.

To effect the foregoing exact centering, and in accord with further steps of the method, a first light responsive cell is oscillated back and forth in the horizontal X axis cross hair direction. Simultaneously, a second light responsive cell is oscillated up and down in the vertical Y axis cross hair direction, the centers of oscillation coinciding with the intersection point of the cross hairs when viewed in a direction normal to the X-Y plane. In this respect, one of the oscillating cells is positioned behind the other to prevent interference.

An X axis center signal is generated by an appropriate photocell whenever the first light responsive cell crosses its center of oscillation. The first light responsive cell further generates a left edge signal when it crosses the left boundary of the projected image of the circular hole and a right edge signal when it crosses the right boundary of this image.

The center and left and right edge signals are utilized to generate an X axis control signal having a value constituting a function of the difference in the time intervals between the X axis center signal and the left edge signal and the X axis center signal and the right edge signal, so that when the two time intervals are equal, the X axis control signal is zero.

It can now be seen that by utilizing this X axis control signal to operate an X axis servo system, the X axis servo system can be made to move the member in a direction so that the image of the hole moves along the X axis cross hair until the two time intervals are equal so that the member is positioned at the given X axis coordinate; that is, exactly centered. In other words, the X axis servo control signal approaches zero as the time intervals approach equality on either side of the center position.

The second Y axis oscillating light responsive cell operates in an identical manner, there being provided top edge and bottom edge signals to define time intervals relative to the center signal so that proper positioning in an up and down direction by a Y axis servo motor signal is achieved.

The developed servo signals can be recorded in memory and used subsequently for programming operations or movements of the art work and thus any table supporting printed circuit boards to be drilled movable with the art work.

BRIEF DESCRIPTION OF THE DRAWINGS

A better understanding of this invention will be had by now referring to the accompanying drawings in which:

FIG. 1 is a highly diagramatic perspective view of basic components making up the two axis centering system of this invention;

FIG. 2 is an enlarged cross section partly schematic in form of one of the components of FIG. 1 looking in the direction of the arrows 2—2;

FIG. 3 is a block diagram useful in explaining electrical drive features of the invention;

DETAILED DESCRIPTION OF THE PREFERRED EMBODIMENT

Figure 4:
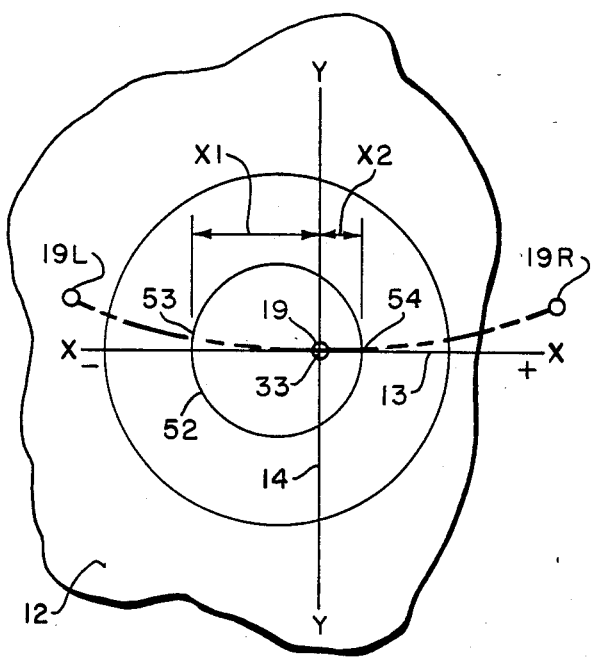
FIG. 4 is a front elevational view of a projected image illustrated in FIG. 1.

Referring to the lower left portion of FIG. 1, there is shown at 10 a master art work provided with several openings at precise retangular coordinate points. One such opening is indicated at 11.

As indicated by the X and Y arrows, the art work 10 can move in an X-Y plane. This movement can be effected by appropriate X and Y axis servo systems operating a table which might support a printed circuit board requiring that holes be drilled at the precise rectangular coordinate points defined by the openings in the art work 10 such as the opening 11. This one example is depicted clearly in FIG. 1 of our heretofore referred to U.S. Pat. No. 3,716,716.

In accord with the present invention, an image of the hole 11 is projected onto a screen 12 shown in the upper right hand portion of FIG. 1. Screen 12 includes X axis and Y axis cross hairs 13 and 14. The projection of the hole 11 is accomplished by a light source 15 shown disposed between the art work 10 in the lower left portion of FIG. 1 and a projection lens 16 above the hole 11. Mirrors 17 and 18 define a lengthened light path permitting magnification of the image so as to provide a relatively large sized light image on the screen 12 as shown. It can be seen that movement of the art work or member 10 along the X and Y axes will move the hole 11 relative to the light source 15 and projection lens 16. When the hole 11 is precisely centered on the optical axis of the light from the light source 15 to the projection lens 16 the projected image will have its center exactly coinciding with the intersection of the cross hairs 13 and 14 on the screen 12. In this respect, it is important to understand that the screen 12 the light source 15, and the projection lens 16 as well as the mirrors 17 and 18 are all fixed. As a result movement of the art work will result in movement of the image relative to the cross hairs along the X and Y axis on the screen 12.

Still referring to FIG. 1, in the upper right hand portion, there is shown a first light responsive cell 19 on the end of a flexible reed 20 supported within a housing 21. Housing 21 incorporates appropriate electrical drive means for oscillating the reed 20 to oscillate the first light responsive cell 19 back and forth at a constant frequency along the direction of the X axis cross hair 13 equal distances on either side of the intersection point of the cross hairs. In other words, the cell 19 at its rest position will appear at the exact intersection point of the cross hairs 13 and 14 when viewed in a direction normal to the X-Y plane of the screen 12.

The first light responsive cell 19 generates signals as will be described subsequently passed from the housing 21 to an integrator and summing circuit 22 in turn providing an output signal to an X axis servo 23. This signal may also be recorded in a memory 24.

In addition to the first light responsive cell 19 moving back and forth along the direction of the X axis, there is provided a second light responsive cell 25 movable at the same constant frequency as the first light responsive cell up and down; that is, equal distances along the direction of the Y axis cross hair 14 on either side of the intersection point.

As in the case of the first light responsive cell 19, the second light responsive cell 25 is supported on the end of a reed 26 so that the same can be rapidly oscillated by appropriate electrical drives in a housing 27. Signals generated by the second light responsive cell 25 pass to a further integrator and summing circuit 28 from which a Y axis control signal passes to a Y axis servo 29. This signal may also be stored in a memory 30.

The control of movement of the art work member 10 by the servo system in an X direction is independent of the control of movement in a Y direction. In other words, the first and second light responsive cells 19 and 25 operate entirely independently of each other and in exactly the same manner. Therefore, a detailed description of the manner in which centering along the X axis is accomplished by the first light responsive cell 19 will suffice for an explanation of the operation of the second light responsive cell 25 in centering along the Y axis.

Thus, referring to FIGS. 2 and 3, there is shown the first light responsive cell 19 secured to the end of the reed 20 in its center or neutral position. Drive coils 31 and 32 when energized will effect oscillation of the reed 20 and thus the first light responsive cell 19 back and forth along an arc corresponding substantially to the direction of the X axis. In this respect, when the movement is described as corresponding to the direction of the X axis cross hair or the Y axis cross hair, it is to be understood that substantial correspondence takes place even though the movement is along a slight arc.

The center or neutral position of the light responsive cell 19 and reed 20 is monitored by a center signal generating photo cell 33. In other words, cell 33 provides a center signal whenever the reed 20 passes the exact neutral or center point shown in solid lines in FIG. 2 in its oscillations. This signal passes to a center signal sensor 34 which in turn utilizes the signals to trigger an integrator as will be described subsequently.

Also provided in the housing 21 is an amplitude sensing photo cell 35 in a fixed position to define the amplitude limit of oscillation of the reed 20 and first light responsive cell 19. Thus, when the reed 20 intercepts the cell 35, an amplitude signal is generated and passed to an amplitude sensor which in turn controls the pulse width of a driving signal for the coils 31 and 32 limiting the energy imparted to the reed 20 so that a given amplitude is not exceeded.

Referring to FIG. 3, the manner in which the electrical drive signals for the coils 31 and 32 are derived as well as the drive signals for the corresponding coils for the second light responsive cell 25 and reed 26 for the Y axis is shown.

Referring first to the upper portion of FIG. 3, there is shown a square wave oscillator 38 providing a square wave signal of four times the frequency at which the respective reeds are to vibrate. The square wave oscillator output signal is divided by two by means of a J-K flip flop 39. The X axis amplitude sensor 36 and X axis pulse width control 37 described briefly in FIG. 2 are shown in FIG. 3 designated by the same numerals 36 and 37. One output from the flip flop 39 passes to the X pulse width control 37 as shown. This output provides an X pulse, the width of which is then controlled by the output from the X axis amplitude sensor 36.

Similarly, there is provided a Y axis amplitude sensor indicated at 40 in FIG. 3 for controlling the width of a Y axis pulse in block 41 provided by the other output from the flip flop 39.

The pulse widths from the blocks 37 and 41 pass through further divide by two flip flops 42 and 43 respectively for providing output signals to the coils on either side of the respective X and Y axis reeds, the coils 31 and 32 corresponding to those described in FIG. 2 for the X axis reed. These signals are provided through appropriate AND gates 44, 45, 46 and 47, these gates being enabled by signals from the X and Y pulse width control blocks 37 and 41. The coils for the Y axis reed are indicated at 48 and 49 in FIG. 3.

In order to avoid possible interference between the X axis and Y axis oscillating cells 19 and 25, the driving coils can be synchronized to be 90° out of phase so that when the X axis first light responsive cell 19 is in a center position, the second light responsive cell 25 for the Y axis is at one of its amplitude limits. This phase locking or synchronization is effected by using a square wave oscillator which has a frequency four times that of the reeds, so that one oscillation covers a 90° movement of the reeds. The divide by two J-K flip flop 39 alternately shifts driving power back and forth between the reeds every 90° so that they are locked into a 90° phase difference.

To prevent the X-axis reed from shifting 180° (depending on its direction of start-up), leads 50 and 51 are connected from the J and K outputs of the divide by two flip flop 43 to the J and K inputs to the flip flop 42 as illustrated in FIG. 3.

Referring now to FIG. 4, the manner in which automatic centering is accomplished will become clear.

In FIG. 4, it is assumed that the hole image is slightly off-center along the X axis direction as shown. The first light responsive cell 19 is oscillating between amplitude limits on either side of the intersection point of the X and Y axis cross hairs 13 and 14. The left amplitude limit is indicated at 19L and the right amplitude limit is indicated at 19R. The distance of swing on either side of the intersection point of the cross hairs is equal since the neutral or center position of the cell 19 corresponds to the intersection point of the cross hairs.

The center sensing photo cell 33 described in FIG. 2 will generate a signal whenever the first light responsive cell 19 crosses the center point; that is, the intersection point between the X and Y cross hairs. As shown, this intersection point is not centered with the center of the projected hole image shown at 52.

As the oscillating first light responsive cell 19 passes the intersection point, an X axis center signal will be generated by the photo cell 33 described in FIG. 2. As the cell continues to move to the left as viewed in FIG. 4, the cell itself will generate a left edge signal when it passes the boundary point 53 of the light image 52; that is, the change in light from light to dark.

When the first light responsive cell moves to the right, another X axis center signal will be generated when it passes the intersection point by the cell 33 and then a right edge signal will be generated at point 54 when the cell passes the boundary of the image 52 from light to dark.

It will be appreciated that the time interval between the X axis center signal generated by the cell 33 and the generation of the left edge signal at point 53 is longer than the time interval from the X axis center signal generated by cell 33 and the right edge signal occurring at boundary 54. This difference in time intervals is a consequence of the off-centering along the X axis as depicted in FIG. 4.

Figure 5:
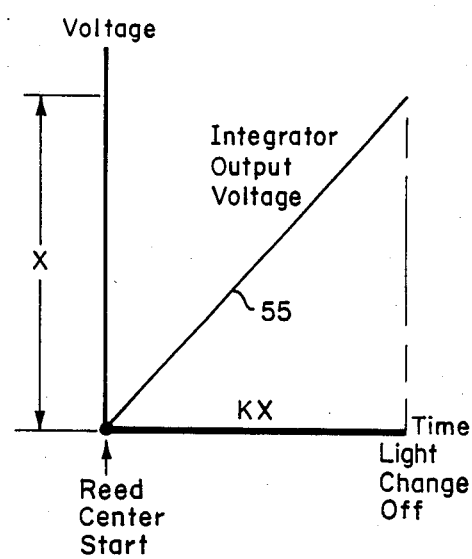
FIG. 5 is a plot of output voltage versus time and/or position of one of the components in FIG. 1; and, FIG. 6 shows a series of diagrams or wave forms useful in an overall explanation of the operation of the invention.

Referring to FIG. 5, there is illustrated the output of the integrator 22 described in FIG. 1. As shown, an integrator output voltage will be generated as indicated by the line 55 at the start point when the reed for the first light responsive cell 19 is at the center position and will then stop integrating the output voltage when a light change occurs; that is, at the boundary 53 or at the boundary 54 depending upon the position of the moving cell. It will be immediately appreciated that the magnitude of the integrated output voltage is a direct function of the time that the integration takes place and since the time interval that the moving cell is to the left of the intersection point is greater than the time interval that the moving cell is to the right of the intersection point in a lighted area of the image, then the respective integrated voltages will have different magnitudes.

Figure 6:
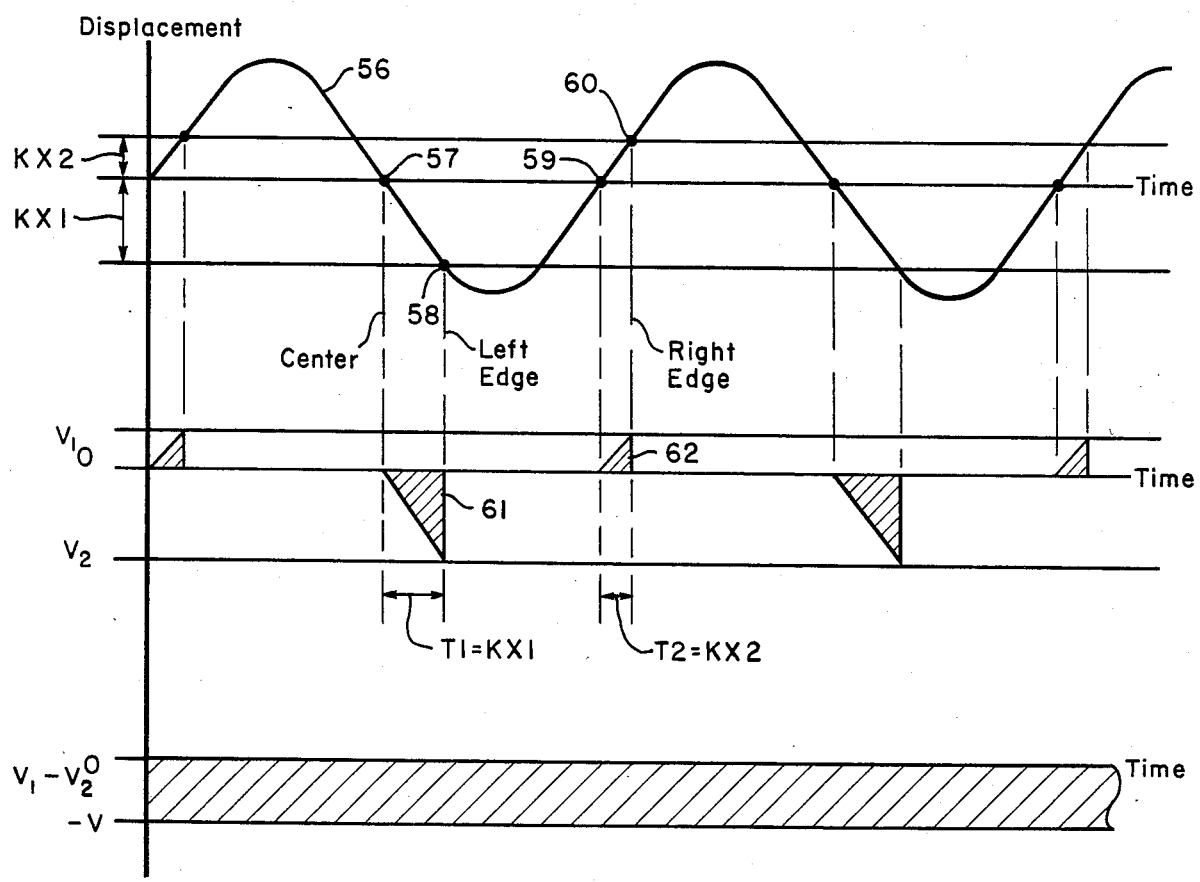

The foregoing can better be understood by referring to the wave forms in FIG. 6. In the top wave form, the sine wave 56 depicts the oscillating motion of the first light responsive cell 19. It passes the center or intersection point of the cross hairs of FIG. 4 at the point 57 in the top diagram of FIG. 6. It then moves to the left edge boundary indicated in the top wave form of FIG. 6 at 58. Thereafter, the oscillating cell will again pass the intersection point depicted at 59 in FIG. 6 and then moved to the right boundary indicated at 60.

Referring to the wave forms below the sine wave 56 in FIG. 6, there is schematically illustrated at 61 and 62 the integrated output voltages from the integrator occurring during the time intervals described. For convenience of control the signals generated whenever the cell is moving to the left as depicted in FIG. 4 are inverted so as to be negative relative to the generated integrated signal when the cell is moving to the right.

The time intervals described heretofore are indicated at T1 and T2 in FIG. 6 and these time intervals are proportional to the distances X1 and X2 as also shown in FIG. 4 demarking the swing on either side of the intersection point before a boundary is reached.

It will be appreciated that if the intersection point of the cross hairs is directly coincident with the center of the image 52, then the time intervals T1 and T2 will be equal. Therefore, if the signals 61 and 62 shown in FIG. 6 are summed together, the net output signal would be zero.

In the example given in FIG. 6, however, off-centering occurs resulting in a greater time interval for T1 than T2 and therefore a greater signal 61 than signal 62. The peak values of the signals 61 and 62 are respectively stored in capacitors to thereby result in voltage levels indicated by the horizontal lines V1 and V2 in the diagram of FIG. 6. Summing of these signals will thus result in a net negative voltage indicated by the level 63 in the bottom diagram of FIG. 6.

This voltage level 63 is used to drive the X axis servo to move the artwork 10 described in FIG. 1 in a direction to cause the image 52 in FIG. 4 to move to the right so that it will become centered on the intersection point of the cross hairs. As the artwork moves to the right, the time intervals T1 and T2 approach equality and thus the summing of the positive and negative signals V1 and V2 results in an output signal approaching zero. At exact center position, the output signal will be zero and the movement of the artwork will stop.

Identical centering is accomplished along the Y axis in FIG. 4 should there be any off-centering of the image 52 along the Y axis.

The oscillation of the first and second light responsive cells is preferably made to correspond to the natural resonant frequency of the reeds and in a specific example might be 45 cps. There is thus a sampling on either side of the intersection point of the cross hairs ninety times each second and a very rapid response to any off-centering results.

In addition, it can be appreciated that even should the light area defined within the image 52 be non-uniform, it is the abrupt change in lighting that generates the signals at the left and right borders or the top and bottom edges and therefore any non-uniformity in lighting of the opening will not effect the precise centering. As a further consequence of generating signals only when a change in the light occurs, the image can be negative wherein the hole area is dark and the opaque area is light.

As described heretofore, the centering information provided from hole to hole in the artwork can be recorded in the memories 24 and 30 described in FIG. 1 for subsequent use in programming movement of a printed circuit board for drilling operations, exact centering always being assured.

From all of the foregoing, it can now be appreciated that the present invention has provided a greatly improved method and apparatus for effecting two axis centering, particularly useful in automatically directing a programming table to a center target on circuit board artwork pads.

We claim:

1. A method of positioning a member at given X and Y rectangular coordinate points, including the steps of:
(a) providing a circular hole in said member;
(b) projecting an image of said hole onto a screen having horizontal and vertical cross hairs defining X and Y axes respectively, said member being positioned at said given rectangular coordinate points when the intersection point of said cross hairs is at the exact center of said image of said circular hole;
(c) oscillating a first light responsive cell back and forth in the horizontal X axis cross hair direction;
(d) simultaneously oscillating a second light responsive cell up and down in the vertical Y axis cross hair direction, the centers of oscillations coinciding with the intersection points of said cross hairs when viewed in a direction normal to the X-Y plane;
(e) generating an X center signal whenever said first light responsive cell crosses its center of oscillation, said first light responsive cell generating a left edge signal when it crosses the left border of said image and a right edge signal when it crosses the right border of said image;
(f) utilizing said X axis center and the left and right edge signals to generate an X axis control signal having a value constituting a function of the difference in the time intervals between the X axis center signal and the left edge signal and the X axis center signal and the right edge signal so that when said time intervals are equal, said X axis control signal is zero;
(g) utilizing said X axis control signal in an X axis servo system to move said member in a direction so that the image of said hole moves along the X axis cross hair until said two time intervals are equal so that said member is positioned at said given X axis coordinate;
(h) generating a Y axis center signal whenever said second light responsive cell crosses its center of oscillation, said second light responsive cell generating a top edge signal when it crosses the top boundary of said image and a bottom edge signal when it crosses the bottom boundary of said image;
(i) utilizing said Y axis center and the top and bottom edge signals to generate a Y axis control signal having a value constituting a function of the difference in the time intervals between the Y axis center signal and the top edge signal and the Y axis center signal and the bottom edge signal so that when said latter time intervals are equal, said Y axis center signal is zero; and,
(j) utilizing said Y axis control signal in a Y axis servo system to move said member in a direction so that the image of said hole moves along the Y axis cross hair until said latter mentioned time intervals are equal so that said member is positioned at said given Y axis coordinate.

2. The method of claim 1, in which said member comprises a master art work having more than one hole, the holes being precisely positioned relative to each other and including the step of recording in a memory program the X axis servo and Y axis servo control signals so that said programs stored in memory may be subsequently used to effect exact centering of the holes in said master art work.

3. A two axis centering system, including, in combination:
(a) a master art work having a circular hole therein;
(b) a screen having horizontal and vertical cross hairs defining X and Y axes respectively;
(c) means for projecting an image of said hole onto said screen, the hole in said master art work being exactly centered only when the center of said projected image coincides with the intersection of said cross hairs;
(d) a first light responsive cell;
(e) means for moving said first light responsive cell back and forth at a constant frequency along the direction of said X-axis cross hair equal distances on either side of said intersection point of the cross hairs;

(f) means for generating an X axis center signal whenever said first light responsive cell crosses said intersection point of the cross hairs, said first light responsive cell generating a left edge signal when it crosses the left boundary of said image and a right edge signal when it crosses the right boundary of said image;

(g) means responsive to said X axis center signal and said left edge signal and to said X axis center signal and said right edge signal to generate an X axis control signal having a value constituting a function of the difference in the time interval between said X axis center signal and said left edge signal and the time interval between said X axis center signal and said right edge signal, said X axis control signal approaching zero as the time intervals become more nearly equal;

(h) means responsive to said X axis control signal to move said art work in a direction so that the image of the hole on said screen moves along the X axis cross hair in a direction tending to equalize said time intervals so that said image will be centered along the X axis cross hair;

(i) a second light responsive cell;

(j) means for moving said second light responsive cell up and down at a constant frequency along the direction of said Y axis cross hair equal distances on either side of said intersection point of the cross hairs;

(k) means for generating a Y axis center signal whenever said second light responsive cell crosses said intersection point of the cross hairs, said second light responsive cell generating a top edge signal when it crosses the top boundary of said image and a bottom edge signal when it crosses the bottom edge of said image;

(l) means responsive to said Y axis center signal and said top edge signal and to said Y axis center signal and said bottom edge signal to generate a Y axis control signal having a value constituting a function of the difference in the time interval between said Y axis center signal and the top edge signal and the time interval between the Y axis center signal and said bottom edge signal, said Y axis control signal approaching zero as said latter time intervals become more nearly equal; and (m) means responsive to said Y axis control signal to move said art work in a direction so that the image of the hole on said screen moves along the Y axis cross hair in a direction tending to equalize said latter time intervals so that said image will be centered along the Y axis cross hair.

4. The subject matter of claim 3, including memory circuits connected to receive said X axis control signal and said Y axis control signal to record said signals in memory for subsequent use in exact centering of said hole.

* * * * *